United States Patent [19]
Vande Water et al.

[11] 3,792,894
[45] Feb. 19, 1974

[54] SELF-STORING VEHICLE DECK

[75] Inventors: Rae E. Vande Water; Owen W. Sherwin; Charles F. Crissy, all of Jackson, Mich.

[73] Assignee: Aeroquip Corporation, Jackson, Mich.

[22] Filed: May 17, 1972

[21] Appl. No.: 254,035

[52] U.S. Cl. ............................. 296/24 R, 187/25
[51] Int. Cl. ............................................. B60p 1/36
[58] Field of Search .................. 187/24, 25; 296/24

[56] References Cited
UNITED STATES PATENTS
3,516,706   6/1970   Bruce ............................... 296/24 R
3,468,401   9/1969   Letz ...................................... 187/25
2,527,897   10/1950  Todd ...................................... 187/25

*Primary Examiner*—Philip Goodman

[57] ABSTRACT

A truck body has a plurality of vertically movable deck units or sections which may be stored beneath the roof and independently lowered to a variety of positions above the main deck. Each deck unit is supported by four vertical threaded rods disposed within guide tracks which may be the internal posts at the vehicle sides. The deck unit is adjusted by simultaneously driving four nuts on the rods through chains and sprockets. All parts of the driving mechanism are permanently attached to the deck unit at all times, and the unit is held in its adjusted position by an automatic locking mechanism carried by the unit.

18 Claims, 7 Drawing Figures

FIG. 5.

SELF-STORING VEHICLE DECK

BACKGROUND OF THE INVENTION

1. Field of the Invention

The invention relates to adjustable decking in trailer and other truck bodies so as to utilize more fully the body volume by providing a second deck for supporting additional loads.

2. Description of the Prior Art

Conventional types of adjustable truck body decks have various inadequacies which it is an object of the present invention to overcome. In some cases, the parts used to adjust and support the deck are removable, and thus may be mislaid or left at an unloading dock when the truck departs. Conventional decking of this nature also requires movable latch mechanisms to lock the deck in its adjusted position, some of these mechanisms being complicated and cumbersome. Self-storing decks on trucks are also not conveniently adjustable to various depths to accommodate different loading situations.

SUMMARY OF THE INVENTION

Briefly, the invention comprises one or more rectangular deck units or sections which are individually movable between an upper stored position immediately beneath the vehicle roof and any of a variety of loading positions above the main deck. The units are in tandem so that decks of various depths can be formed by using multiple units, with the forwardmost unit being lowered first and loaded, and succeeding units lowered thereafter.

Each deck unit is supported by four threaded rods secured at their upper and lower ends to the truck body structure, and is guided by vertical tracks. The deck unit has four nuts adjacent its corners threaded onto the rods, the nuts being simultaneously rotated. The means for rotation comprises a rotary handle beneath each deck unit which drives a continuous chain extending around the periphery of the unit and engaging sprockets on the nuts. A latch pin on the handle recessed within the profile of the deck, engages a lock plate on the deck unit to secure the unit in its adjusted position. Thus, all four nuts will be simultaneously rotated to maintain the deck unit parallel to the floor of the truck body at all times.

All parts of the mechanism are captive to the truck body and thus cannot be mislaid. The deck units in their stored position will be at the top of the vehicle where utilization of volume is usually impractical, and thus will not occupy normally usuable volume. The individual units may be raised or lowered in a matter of seconds, the mechanism being simple and efficient, and the lock being automatic. The threaded rods and their associated parts are recessed within vertical guide tracks for the deck units to limit lateral and fore-and-aft movement and possible damage to said mechanisms. When a deck unit is loaded, the high unit load on the latch pin will prevent inadvertent release of the unit which might cause damage or injury. The result is a safe, flexible and easily manipulated second deck storage system for truck bodies which is uncomplicated and easy to manufacture, install and maintain.

BRIEF DESCRIPTION OF THE DRAWINGS

FIG. 2 is a fragmentary plan view showing portions of three of the deck units and their drive mechanisms, the rear door being to the right.

FIG. 6 is a fragmentary cross-sectional view in elevation of one of the deck units showing the nut driving and locking mechanism; and FIG. 7 is a fragmentary top plan view of the mechanism of FIG. 6, the deck being removed for clarity.

DESCRIPTION OF THE PREFERRED EMBODIMENT

Figure 1:
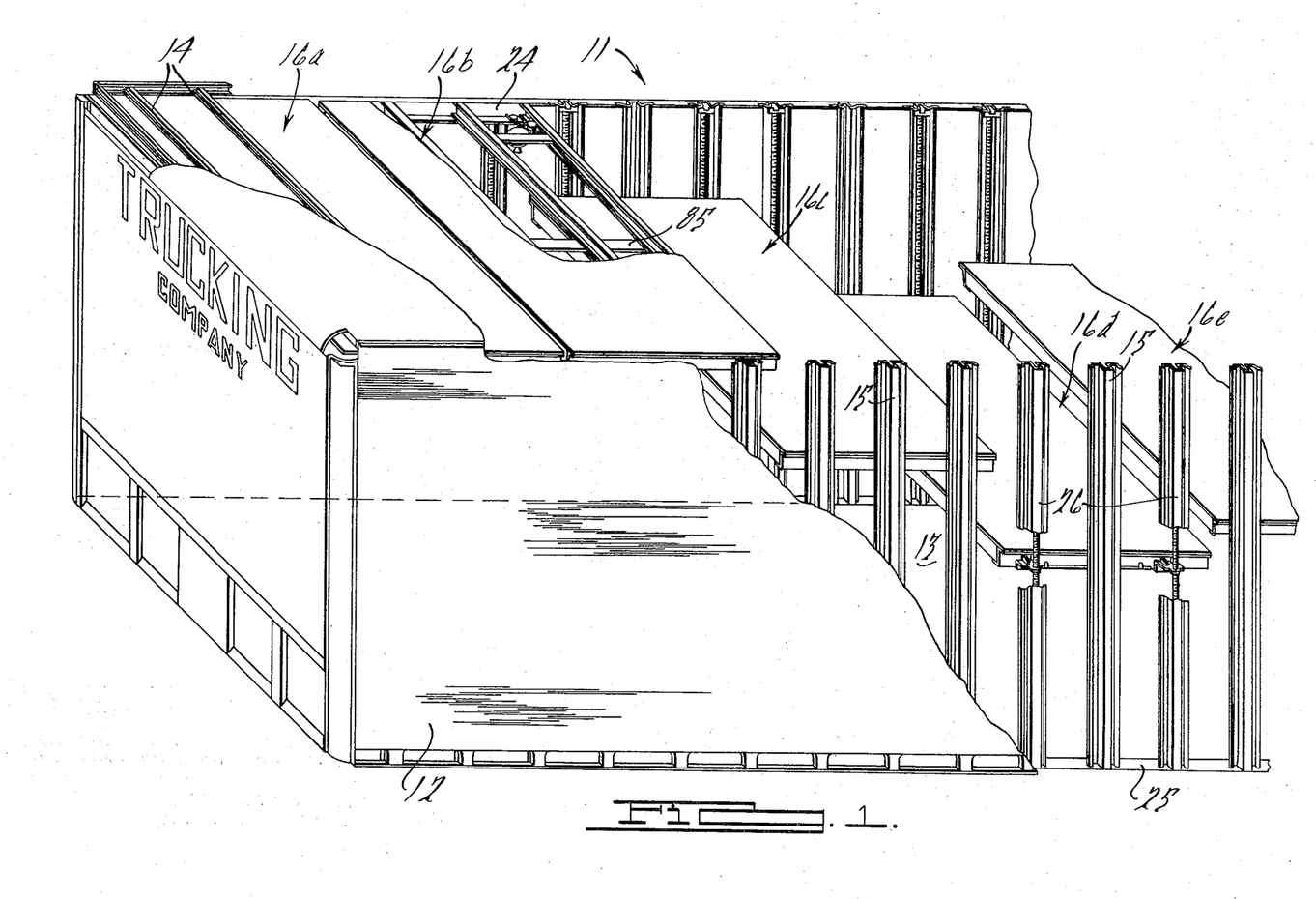
FIG. 1 is a perspective view of a truck body with parts broken away, showing five deck units constructed in accordance with the invention, three of the units being in loading position and two in storage position for purposes of the description.

A trailer or other truck body is generally indicated at 11 in FIG. 1 and has a skin or outer wall 12, the floor (main deck) of the body being indicated at 13 and the roof at 14. The body is conventionally provided with spaced posts 15 in the form of channels with outwardly extending flanges as shown in FIGS. 1 and 2, these posts extending between the floor and roof.

The novel deck units or sections of this invention are generally indicated at 16, five such units being shown in FIG. 1 and indicated at 16a through 16e respectively. Units 16a and b are shown in a storage position and units 16c, 16d and 16e in a loading position. The positions of the units are merely for purposes of demonstration, however, it being understood that the units may be individually adjusted between storage and loading positions to suit particular requirements.

Each deck unit 16 is of rectangular shape, extending between the sides of the body but being of a depth approximating that which is conveniently accessible for loading. The units are adjacent each other so that when at the same lever they will form a continuous deck extending parallel to and above floor 13. In their storage position, the units will be immediately below the roof.

Each unit comprises an upper surface 17, seen in FIG. 5, a plurality of parellel I-beams 18 extending across the vehicle below surface 17, channel-shaped outer cross beams 19 and a pair of Z-shaped headers 21 extending across the ends of beams 18 and 19. Surface 17 may be plywood, metal or plastic, a suitable construction comprising ¼ inch plywood encased in 26 gauge corrosion resistant steel. In order to allow space for the deck adjusting mechanism, described below, the side edges of surfaces 17 are spaced inwardly from posts 15, matching the outer edges of beams 19 and headers 21.

Figure 3:
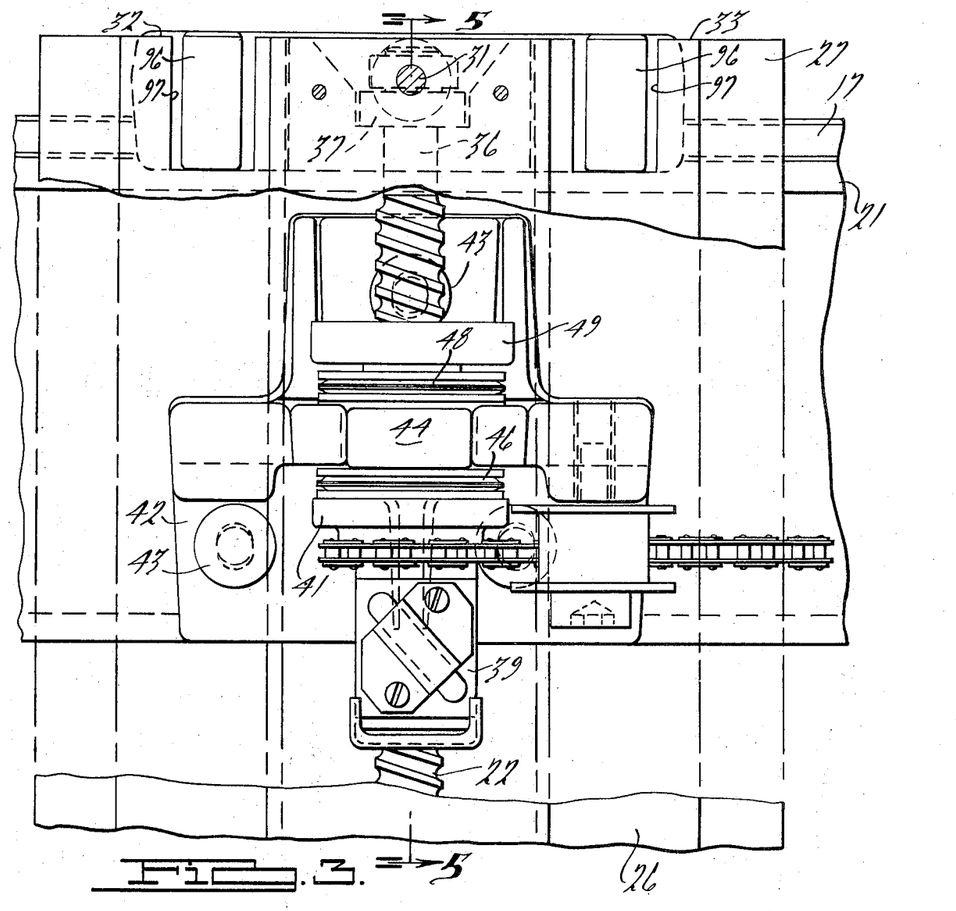
FIG. 3 is a fragmentary side elevational view of one of the guide tracks showing an upper support for the threaded rod as well as a nut at one corner of the deck unit and its associated mechanism.
Figure 4:
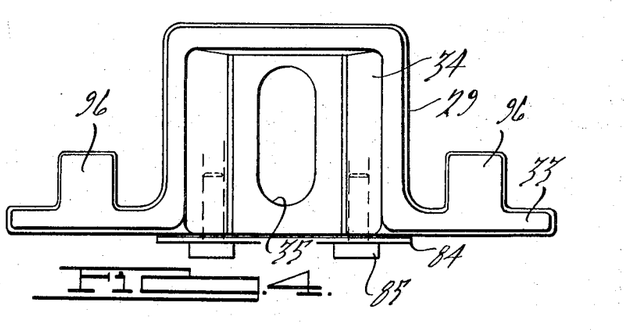
FIG. 4 is a top plan view of the upper rod support.
Figure 5:
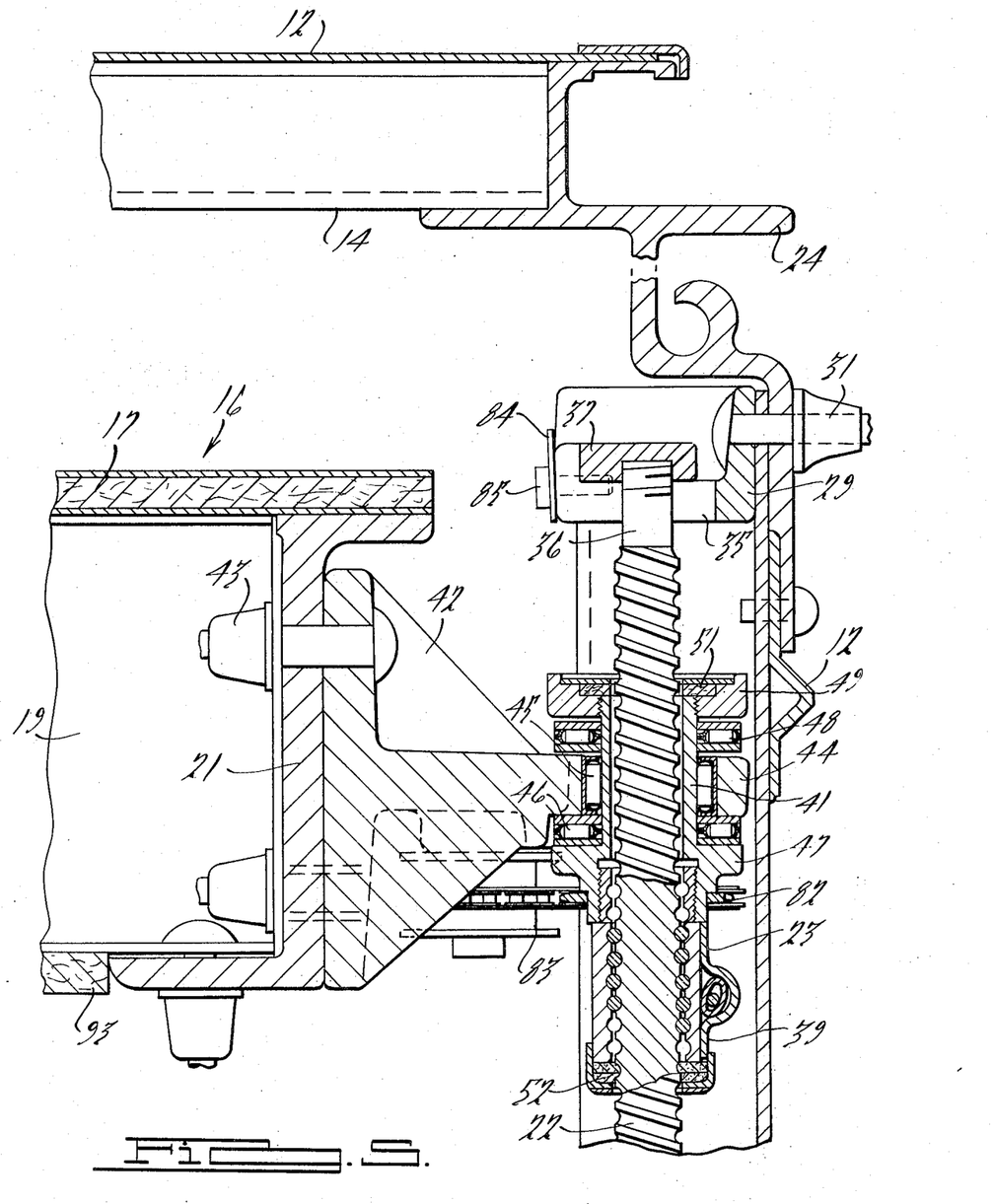
FIG. 5 is a cross-sectional view in elevation taken along the line 5—5 of FIG. 3 and showing further details of the corner load support for the deck unit, nut and associated parts.

The means for adjusting the height of each deck unit 16 comprises four stationary vertical threaded rods 22 carried by body 11 adjacent the four corners of each unit, and four rotatable nuts 23 carried adjacent the corners of each unit and threaded on rods 22 (FIG. 5). The means for mounting rods 22 on the truck or trailer body is best seen in FIGS. 1, 3, 4 and 5. As seen in FIG.

1, upper and lower trailer wall sills 24 and 25 extend along the length of each side of the body. At intervals these sills support combined posts and decking guide tracks 26. The guide tracks are channel-shaped in construction but of somwhat heavier gauge than posts 15, and like the posts have outwardly extending flanges 27. The webs of guide tracks 26 and posts 15 are adjacent trailer skin 12. An inner skin 28, for example of plywood, extends between the flanges of posts 15 and guide tracks 26.

The upper and lower ends of each threaded rod 22 are carried by supports 29 which are secured by fastener 31 (FIG. 5) within the upper and lower ends of each guide track 26 and the tab inserts 96 which are received by notches 97 in the track. The construction of a support 29 is shown in FIGS. 3, 4 and 5, the support having a pair of mounting flanges 32 and 33 and a central flared recess 34 with a slot 35. The face of the support holds a restraint plate 84 secured in position by fasteners 85. The upper and lower ends 36 of rod 22 extend into slots 35 (support 29 at the bottom of each guide track 26 is not shown but is inverted from the position of the upper supports). A sliding nut 37 is permanently mounted on upper end 36 of rod 22. The base of rod 22 is secured by a threadably mounted nut (not shown) which permits vertical adjustment of the motion of rod 22. The arrangement is such that rods 22 will be held against rotational movement, but can slide from side to side and fore and aft to a limited degree. This is to compensate for changes in the wall-to-wall dimensions of the trailer.

A ball nut 39 is threadably mounted on each rod 22 (FIGS. 3 and 5), the nut being attached to a bearing race 41. This race extends through a load support 42 secured by fasteners 43 to the adjacent portion of header 21. Support 42 projects into guide track 26 so that four tracks guide each deck unit 16 and limit its fore-and-aft and lateral movement. The support has an apertured portion 44 surrounding rod 22 and race 41, a radial bearing 45 being disposed in this aperture. A thrust bearing and washer assembly 46 is disposed between the underside of support portion 44 and a shouldered portion 47 on race 41, and another such assembly 48 is disposed between the upper surface of support portion 44 and a restraint nut 49 mounted at the upper end of race 41. The restraint nut is intended to prevent accidental lifting of load support 42 away from the bearings. Thrust washer and bearing assembly 48 will provide a relatively frictionless motion when support 42 is accidentally pressed in the upward position, away from the lower bearing race. Felt lubricant-retaining wipers 51 and 52 are provided for the top and bottom respectively of the bearing race.

The means for vertically adjusting each deck unit 16 on its rods 22 is carried by the unit itself and contained within its lateral and vertical confines, as seen in FIGS. 2, 6 and 7. This mechanism comprises a crank 53 carrying a handle 54. Crank 53 is rotatably mounted on a bolt 55 secured to a mounting bracket 56 (FIG. 7) which extends between beams 18 and 19 at the rear of the deck unit below surface 17. Bolt 55 passes through a spacer 86 which in turn passes through a bushing 57 and a surrounding boss 58, and a lock plate 59 is disposed between boss 58 and the underside of mounting bracket 56. The arrangement is such that bolt 55 fastens boss 58 to lock plate 59 which is rotatably mounted on bracket 56. Crank 53 is attached to boss 58, as is a latch sprocket 61. Handle 54 can move vertically with respect to crank 53 and carries a latch pin 62 by means of an arm 63. The handle together with arm 63 and pin 62 are normally urged by a spring 64 to an upper or locking position as shown in FIG. 6 in which the latch pin, passing through clearance holes 65 and 66 in crank 53 and sprocket 61 respectively, enters one of a series of holes 67 in lock plate 59. These locking holes are seen best in FIG. 7 and are circularly arranged at equal intervals around the locking plate. The holes as illustrated are so located that the latch pin will engage a locking hole every 60° which in a typical installation will allow locking of the deck unit at vertical intervals of 9/32 of an inch. When handle 54 is drawn downwardly from its FIG. 6 position, latch pin 52 will be withdrawn from locking hole 67 permitting crank 53 to be rotated along with latch sprocket 61.

A series of ratchet teeth 87 are formed around the periphery of lock plate 57 which are engaged by a spring loaded pawl 88. A spring 89 maintains the pressure of pawl 88 against the outside of lock plate 59. Ratchet teeth 87 are located so that lock plate 59 is restrained against rotation in a clockwise (lowering) direction in FIG. 7, but will permit pawl 88 to disengage when rotated counterclockwise (raising direction). Thus, should a force be exerted against the base of the deck platform, the load will shift from the bearing assembly 46 to bearing assembly 48. This will drive the operating mechanism backwards rotating sprocket 61 counterclockwise in FIG. 7. Because latch pin 62 is engaged in lock plate 59 the latter will rotate, allowing the deck to ascend and averting damage to the operating mechanism. When a load is again placed upon the top of the deck, the lock plate will rotate to engage pawl 88 and again be locked against descent.

A jackshaft assembly 68 (FIGS. 6 and 7) is secured to the inside of the rearward beam 19 of each deck unit 16, this assembly comprising a bracket 69 having a jackshaft 71. A drive sprocket 72 is secured to the upper end of the jackshaft, and a chain 73 connects this sprocket with latch sprocket 61. A transmission sprocket 74 is secured to the lower end of jackshaft 71, this sprocket being of larger diameter than sprocket 72 so as to furnish a speed increasing drive. A chain 75 on sprocket 74 also engages an idler 76 carried by an arm 77 secured to the underside of jackshaft 71. A tension spring 79 urges idler 76 against the transmission chain.

Chain 75 is continuous and drives all four nuts of the deck unit to rotate them on their respective rods. More particularly, as seen in FIG. 2, chain 75 extends from idler 76 around an idler 81 mounted on header 21, through clearance apertures in the adjacent header 21 and load support 42 and around a chain sprocket 82 (FIG. 5) secured to bearing race 47. From there the chain goes around an idler 83 carried by load support 42, around another idler 83 carried by the forward load support 42 on the same header 21, and around the chain sprocket 82 associated with that load support. From there the chain crosses deck unit 16 to the other side of the trailer and then passes around sprockets 82 and idlers 83 at the other two load supports. From the fourth load support chain 75 passes around an idler 91 mounted on a pivoted arm 92 spring-loaded to provide slack takeup in the chain when moved in opposition to idler 76. From idler 91 the chain returns to transmission sprocket 74.

The transmission chain is protected by a piece of plywood 93 notched at 94 to allow access to the handle area and at 95 to the reverse takeup idler assembly. Plywood 92 also serves as a reinforcement at the base of the beams and channels. For purposes of clarity, plywood 93 is shown only in FIG. 2.

To lower the deck unit, the drive mechanism handle 54 will be pulled down from its FIG. 6 position, thus retracting latch pin 62 from lock plate 59. Crank 53 may then be turned, driving transmission chain 75 through chain 73 and jackshaft 71. This will rotate all four ball nuts 39 in a descending or counter-direction. When the unit has reached its desired position, handle 54 will be released, permitting spring 64 to urge latch pin 62 against lock plate 59. If the latch pin is aligned with a locking hole 67, the deck unit will be locked; if not, the pin will rest against the lock plate until a minor load is placed on the deck, at which time the free running ball nuts will descend, rotating the chain drive which will move the handle mechanism until latch pin 62 snaps into the next locking hole 67. Thus, the locking mechanism is completely automatic to prevent inadvertent ascent or descent throughout the range of adjustability.

To raise, it is only necessary to rotate the handle since the ratchet device on the lock plate will allow the counterclockwise rotation of the handle without disengaging the latch pin. The ratchet device will lock in the same manner as previously described with the latch pin.

It should be observed that the supports for threaded rods 22 are such that the rods will always be loaded in tension, regardless of whether the force on deck unit 16 is exerted from above or below. For example, a downward force on rods 22 will cause upper nuts 37 to press against their rod supports 29, whereas an upward force, such as might occur when cargo is inadvertently lifted from the floor against the underside of the deck, will cause lower nut 37 to press upwardly against its rod support 29.

The continuous transmission chain 75 which simultaneously drives all four nuts will move the entire deck unit in a synchronized manner and maintain the same attitude to the walls and floor of the containing vehicle regardless of the vehicle position or the deck position. The guide tracks 26 and load supports 42 will at all times afford both side-to-side and fore-and-aft motion restraint. Any deck unit 16 on the vehicle may be used independently of any other unit, providing load height versatility. When a load is on a unit 16, the high unit load on latch pin 62 will prevent inadvertent release of the lock by manipulation of handle 54.

We claim:

1. In a deck unit for a truck body, a plurality of vertical stationary threaded rods mounted on the truck body adjacent the edges of the deck unit, nuts carried by said deck unit and mounted on said rods, means permanently attached to said deck unit for simultaneously rotating said nuts in either direction whereby the deck unit may be raised or lowered, means locking said deck unit in its adjusted position, and means responsive to an upward force exerted on said deck unit for permitting the deck unit to be raised and held in the raised position, said last-mentioned means comprising a rotatable handle on the deck unit and having means coacting with a lock plate carried by the deck unit and pawl and ratchet means permitting rotation of the lock plate only in one direction.

2. In a deck unit for a truck body, a plurality of vertical stationary threaded rods mounted on the truck body adjacent the edges of the deck unit, nuts carried by said deck unit and mounted on said rods, means permanently attached to said deck unit for simultaneously rotating said nuts in either direction whereby the deck unit may be raised or lowered, means locking said deck unit in its adjusted position, said deck unit being of rectangular shape and extending between the sides of the truck body, there being four stationary threaded rods adjacent the corners of the deck unit supported by the truck body, and load supports adjacent the deck unit corners and supported by said nuts.

3. The combination according to claim 2, further provided with vertical guide tracks mounted on the truck body adjacent the corners of the deck unit, said load supports coacting with said guide tracks and limiting movement of the deck unit laterally and in a fore-and-aft direction.

4. The combination according to claim 3, said guide tracks being of recessed construction, said load supports projecting into said guide tracks, said stationary threaded rods being in the recess formed by said guide tracks and passing through said load supports.

5. The combination according to claim 3, said truck body being further provided with a second deck unit constructed similarly to the first unit and adjacent thereto.

6. In a deck unit for a truck body, a plurality of vertical stationary threaded rods mounted on the truck body adjacent the edges of the deck unit, nuts carried by said deck unit and mounted on said rods, means permanently attached to said deck unit for simultaneously rotating said nuts in either direction whereby the deck unit may be raised or lowered, said nut rotating means comprising sprockets secured to said nuts, a continuous chain extending around said sprockets, a transmission sprocket rotatably mounted on the underside of said deck unit, a crank and handle driving said transmission sprocket, locking means comprising a lock plate carried by said deck unit and having a plurality of locking apertures, and a latch pin normally urged toward said lock plate and retractable by said handle to permit crank rotation.

7. The combination according to claim 6, said lock plate being connected to said deck unit by one-way connecting means, whereby the deck unit will be raised in response to a force exerted thereon and held in its raised position.

8. In a deck unit for a truck body, a plurality of vertical stationary threaded rods mounted on the truck body adjacent the edges of the deck unit, nuts carried by said deck unit and mounted on said rods, means permanently attached to said deck unit for simultaneously rotating said nuts in either direction whereby the deck unit may be raised or lowered, means locking said deck unit in its adjusted position and being within the lateral confines of said deck unit, said nut rotating means comprising sprockets secured to said nuts, a continuous chain extending around said sprockets, a transmission sprocket rotatably mounted on the underside of said deck unit, and a crank and handle driving said transmission sprocket.

9. In a deck unit for a truck body, a plurality of vertical stationary threaded rods mounted on the truck body adjacent the edges of the deck unit, nuts carried by said deck unit and mounted on said rods, means permanently attached to said deck unit for simultaneously rotating said nuts in either direction whereby the deck unit may be raised or lowered, means locking said deck unit in its adjusted position, said nut rotating means comprising sprockets secured to said nuts, a continuous chain extending around said sprockets, a transmission sprocket rotatably mounted on the underside of said deck unit, a crank and handle driving said transmission sprocket, and a jackshaft on the underside of said deck unit and carrying said transmission sprocket, said crank being connected to said jackshaft by a chain and sprockets.

10. In a deck unit for a truck body, a plurality of vertical stationary threaded rods mounted on the truck body adjacent the edges of the deck unit, nuts carried by said deck unit and mounted on said rods, means permanently attached to said deck unit for simultaneously rotating said nuts in either direction whereby the deck unit may be raised or lowered, means locking said deck unit in its adjusted position, said locking means comprising a lock plate carried by said deck unit, a latch pin carried by said nut rotating means and normally urged toward said lock plate so as to enter any of a plurality of locking holes thereon, and means for retracting said latch pin from said lock plate.

11. In an adjustable deck construction for a truck body, a plurality of rectantular deck units adjacent each other in the truck body, each deck unit being movable between an upper stored position immediately beneath the roof of the truck body and any of a variety of loading positions, each deck unit extending between the sides of the truck body but being sufficiently shallow to be accessible for loading, whereby movement of adjacent deck units to the same level will permit the deck units to be successively loaded from the forward end of the truck body to the aft end thereof, and means for adjusting the position of each deck unit comprising four stationary vertical threaded rods secured to the sides of the truck body adjacent the corners of the deck unit, nuts carried by said deck unit and threaded on said rods, means permanently attached to the deck unit for simultaneously rotating the nuts to raise or lower the deck unit, and means carried by each deck unit locking it in its adjusted position.

12. The combination according to claim 11, said nut rotating means being manually operable by a handle, said locking means being responsive to release of said handle for locking the deck unit against downward movement.

13. In an adjustable deck construction for a truck body, a plurality of rectangular deck units adjacent each other in the truck body, each deck unit being movable between an upper stored position immediately beneath the roof of the truck body and any of a variety of loading positions, each deck unit extending between the sides of the truck body but being sufficiently shallow to be accessible for loading, whereby movement of adjacent deck units to the same level will permit the deck units to be successively loaded from the forward end of the truck body to the aft end thereof, and means for adjusting the position of each deck unit comprising four stationary vertical threaded rods secured to the sides of the truck body adjacent the corners of the deck unit, nuts carried by said deck unit and threaded on said rods, means permanently attached to the deck unit for simultaneously rotating the nuts to raise or lower the deck unit, recessed vertical guide tracks secured to the truck body adjacent the corners of each deck unit, said guide tracks being secured to said truck body, means at the upper and lower ends of said guide tracks supporting said stationary threaded rods, and means on said deck unit coacting with said guide tracks to limit fore-and-aft lateral movement thereof.

14. The combination according to claim 13, said last-mentioned means comprising load supports extending from said deck unit and supported by said nuts, said rods extending through said load supports.

15. In an adjustable deck construction for a truck body, a plurality of rectangular deck units adjacent each other in the truck body, each deck unit being movable between an upper stored position immediately beneath the roof of the truck body and any of a variety of loading positions, each deck unit extending between the sides of the truck body but being sufficiently shallow to be accessible for loading, whereby movement of adjacent deck units to the same level will permit the deck units to be successively loaded from the forward end of the truck body to the aft end thereof, and means for adjusting the position of each deck unit comprising four stationary vertical threaded rods secured to the sides of the truck body adjacent the corners of the deck unit, nuts carried by said deck unit and threaded on said rods, and means permanently attached to the deck unit for simultaneously rotating the nuts to raise or lower the deck unit, said nut rotating means comprising sprockets attached to said nuts, a continuous chain engaging said sprockets, and a crank, handle and transmission on the sprocket underside of said deck unit for driving said chain.

16. In an adjustable deck construction for a truck body, a plurality of rectangular deck units adjacent each other in the truck body, each deck unit being movable between an upper stored position immediately beneath the roof of the truck body and any of a variety of loading positions, each deck unit extending between the sides of the truck body but being sufficiently shallow to be accessible for loading, whereby movement of adjacent deck units to the same level will permit the deck units to be successively loaded from the forward end of the truck body to the aft end thereof, and means for adjusting the position of each deck unit comprising four stationary vertical threaded rods secured to the sides of the truck body adjacent the corners of the deck unit, nuts carried by said deck unit and threaded on said rods, means permanently attached to the deck unit for simultaneously rotating the nuts to raise or lower the deck unit, vertical guide tracks on said truck body for said deck unit, means at the upper and lower ends of said guide tracks for supporting said threaded rods, said guide tracks being of channel-shaped construction, the rods being in the recesses formed by said guide tracks, means carried by said deck unit projecting into said guide track spaces to limit fore-and-aft and lateral movement of the deck unit with respect to the truck body, said last-mentioned means comprising load supports secured to said deck units, said load supports surrounding said rods and resting on said nuts, said nut rotating means comprising a continuous chain engaging sprockets secured to said nuts, and a handle rotatably mounted on the deck unit and drivably connected to said chain.

17. The combination according to claim 16, said locking means comprising a lock plate having a plurality of locking holes, and a retractable latch pin for said holes operable by said handle.

18. The combination according to claim 17, said lock plate having a pawl and ratchet connection with its deck unit, whereby the deck unit may be raised by rotating said handle without withdrawing said latch pin and may also be raised by an upward force exerted on the deck unit.

* * * * *